May 25, 1926.
C. PHELPS
1,586,216
MECHANICAL MOVEMENT
Filed June 19, 1923
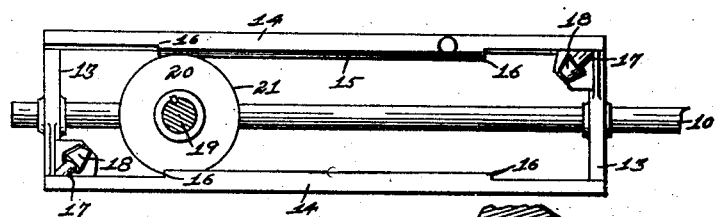
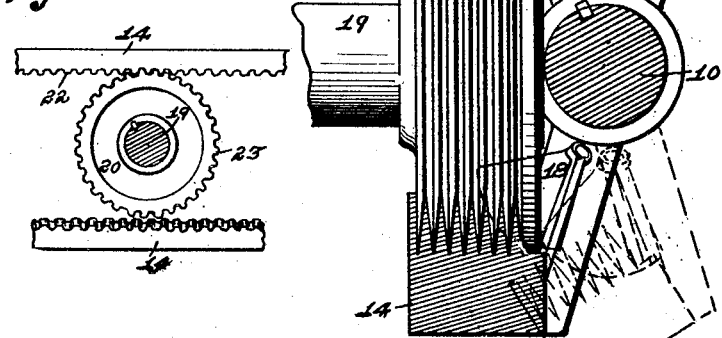
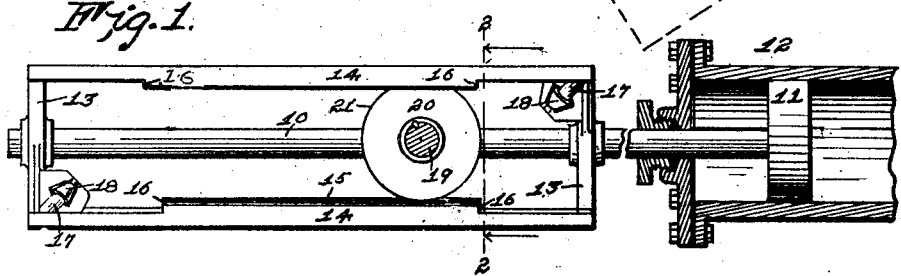
Inventor
Charles Phelps
by Orwig & Hager Attys Patented May 25, 1926.

1,586,216

UNITED STATES PATENT OFFICE.

CHARLES PHELPS, OF OSKALOOSA, IOWA.

MECHANICAL MOVEMENT.

Application filed June 19, 1923. Serial No. 646,325.

The object of my invention is to provide a mechanical movement of simple, durable and inexpensive construction for transmitting an alternately reciprocating motion into a rotary motion.

More specifically it is my object to provide a mechanical movement of this class especially adapted for transmitting the motion from an engine piston to a revolving shaft; and to provide a device of this character in which there are few parts not likely to get out of order, and in which the maximum power of the engine may be applied to the rotary shaft when the engine piston is at substantially the end of its movement.

My invention consists in the construction, arrangement and combination of the various parts of the device, whereby the objects contemplated are attained, as hereinafter more fully set forth, pointed out in my claims, and illustrated in the accompanying drawings, in which:—

Figure 1 shows a side elevation of a device embodying my invention. In this figure the engine cylinder is shown in section and the engine piston mounted in the engine cylinder and connected to the reciprocating shaft.

Figure 2 shows an enlarged, detail, sectional view on the line 2—2 of Figure 1, the dotted lines in said figure showing the tilting power transmitting frame at its limit of movement opposite that shown by dotted lines.

Figure 3 shows a side elevation of my improvement showing the tilting power transmitting frame in a position different from that shown in Figure 1; and Figure 4 shows a detail view of a portion of the tilting power transmitting frame and the driven member showing a modified form in which gear teeth are employed.

Referring to the accompanying drawings, I have used the reference number 10 to indicate the reciprocating driving shaft. On one end of the shaft is a piston 11 mounted in an engine cylinder 12.

Fixed to the shaft 10 is a tilting power transmitting frame comprising two end members 13 and two longitudinal connecting members 14. On the faces of the members 14 adjacent to the shaft 10 I have formed a series of longitudinally arranged V-shaped grooves 15 extending from the central portion of the member 14 to points spaced apart from the ends thereof at 16.

Fixed to the upper right corner of the tilting frame is a stationary shaft 17 extending downwardly and toward the vertical center of the tilting frame and mounted upon this shaft is a rotatable cone shaped guide wheel 18. At the lower left corner of the tilting frame is a similar shaft and guide wheel extending upwardly and toward the vertical center of the tilting frame.

The rotatable driven shaft is indicated by the numeral 19 and is extended at right angles to the shaft 10. Fixed to the shaft 19 is the driving wheel 20, its periphery being formed of a series of tapered ribs 21 of such size and shape as to enter and fit into the grooves 15.

The relative arrangement of the tilting frame and the driven wheel 20 is such that when the tilting frame is in position at one limit of its movement, as illustrated by solid lines in Figure 2, the tapered ribs 21 will enter and fit the V-shaped grooves 15 on the lower member 14, and when in this position the upper member of the tilting frame will be out of contact with the wheel 20, and when the tilting frame is moved to its opposite limit as shown by dotted lines in Figure 2, then the tapered ribs 21 of the driven wheel 20 will enter and fit the grooves 15 on the upper member of the tilting frame. When the tilting frame is in either of said positions and the shaft 10 is moved longitudinally, a rotary motion will be transmitted to the driven wheel 20.

When the tilting power transmitting frame approaches either end of its stroke, the cone shaped guide wheel 18 at that end will engage the adjacent face of the driven wheel 20, and as the tilting power transmitting frame further moves toward the end of its stroke, the said wheel 20 will tilt the frame from one limit of its movement to the other, thus placing the tilting frame in position for holding its member 14 in the position for assuming driving engagement with the driven wheel 20 when the tilting frame moves longitudinally far enough to have the ribs 21 and the grooves 15 engage.

By this arrangement, it is obvious that at each end of the stroke of the shaft 10, the tilting frame will be moved from one of its positions to the other at the instant the movement of the tilting frame when the end of the grooves 15 has been reached by the driven wheel, and during this time that the ribs and grooves 21 and 15 are out of mesh, the frame is tilted so that upon the return movement, the opposite set of grooves 15 is engaged by the ribs 21.

The shaft 10 being directly connected to the piston 11 causes the piston to be tilted in unison with the frame 14, and inasmuch as pistons have considerable friction bearing surfaces in the interior of the cylinder, this frictional engagement of the piston will hold the tilting frame in any of the positions to which it is moved, so that the combined action of the cone shaped guide wheels 14 and the piston within the cylinder will produce a steady and uniform movement of the tilting frame at the time the tilting frame is being shifted from one of its positions to the other.

Furthermore, the friction of the piston within the cylinder will tend to hold the tilting frame against rotary movement such as would tend to cause the grooves 15 and the ribs 21 to separate during the power transmitting movement of the tilting frame. I have found that for certain classes of work the friction of the piston within the cylinder is always necessary to hold the driving and driven members into operative engagement in addition to the positive acting guide devices, not herein shown or described.

In the modified form shown in Figure 4 I have shown cog teeth 22 on the frame members 14, and cog teeth 23 on the driven wheel 20, in lieu of the coacting ribs 21 and grooves 15 illustrated and described in the preferred form of my invention.

I claim as my invention:

1. An improved mechanical movement, comprising in combination, a shaft capable of longitudinal reciprocating movement, a power transmitting frame pivotally connected to the shaft in such manner as to be capable of tilting movement laterally relative to the longitudinal axis of the shaft, said frame being formed with two power transmitting members substantially parallel with the shaft on opposite sides thereof, a driven rotary shaft, a wheel thereon, said wheel having its periphery designed to be alternately engaged and driven by the power transmitting members of the frame, and automatic tilting devices arranged adjacent to each end of the frame, and each being capable when engaged by the driven wheel of tilting the frame laterally, thereby moving one of the power transmitting members into position in operative engagement with the wheel and the other laterally to position out of operative engagement with the wheel.

2. An improved mechanical movement comprising in combination a shaft capable of longitudinal reciprocating movement, a power transmitting frame thereon, a driven shaft, a wheel fixed to the driven shaft, said power transmitting frame being formed with two power transmitting members on opposite sides of the reciprocating shaft, said parts being so arranged that when the tilting frame is moved to one position, one of the power transmitting members will be in driving engagement with the driven wheel and when moved to its limit of movement, the other power transmitting member will be in driving engagement with the said wheel, and means for automatically tilting the frame at each end of its stroke, said means comprising a guide device carried by the frame and designed to engage the face of the driven wheel.

3. An improved mechanical movement comprising in combination a shaft capable of longitudinal reciprocating movement, a power transmitting frame thereon, a driven shaft, a wheel fixed to the driven shaft, said power transmitting frame being formed with two power transmitting members on opposite sides of the reciprocating shaft, said parts being so arranged that when the tilting frame is moved to one position, one of the power transmitting members will be in driving engagement with the driven wheel and when moved to its limit of movement, the other power transmitting member will be in driving engagement with the said wheel, and means for automatically tilting the frame at each end of its stroke, and a guide device at each end of the frame comprising a cone shaped wheel so shaped and positioned that as it approaches the driven wheel, it will engage the face thereof and be rotated thereby and move the tilting frame in position for moving one of the power transmitting members away from position for engagement with the periphery of the driven wheel and for moving the other power transmitting member into position for engagement with the driven wheel.

4. An improved mechanical movement comprising in combination a shaft, a piston on the shaft, a cylinder in which the piston is mounted for reciprocating movement, a power transmitting frame fixed to the shaft and formed with two power transmitting members parallel with the shaft and on opposite sides thereof, a driven wheel, the said power transmitting members and the driven wheel being formed with coacting power transmitting means, said means on the power transmitting members terminating at a point spaced apart from the ends of the power transmitting frame far enough to permit said means to disengage the wheel when the frame is at either limit of its movement, and means for tilting the power transmitting frame when at either limit of its movement.

5. An improved mechanical movement comprising in combination a shaft, a piston on the shaft, a cylinder in which the piston is mounted for reciprocating movement, a power transmitting frame fixed to the shaft and formed with two power transmitting members parallel with the shaft and on opposite sides thereof, a driven wheel, the said power transmitting member and the driven wheel, being formed with coacting power transmitting means, said means on the power transmitting members terminating at a point spaced apart from the ends of the power transmitting frame far enough to permit said means to disengage the wheel when the frame is at either limit of its movement, and means for tilting the power transmitting frame when at either limit of its movement, said means comprising cone shaped guide wheels at the opposite ends of the frame and adjacent to opposite sides of the frame, said guide wheels being so shaped and positioned that they will engage the face of the driven wheel as the frame approaches the end of its stroke.

6. In a device of the class described, the combination of a shaft capable of longitudinal reciprocating movement, a tilting frame pivotally mounted thereon, said frame being provided with two power transmitting members parallel with the shaft and on opposite sides thereof, each of said members having on its face adjacent to the first a series of V-shaped grooves, the driven wheel having a series of tapered ribs on its periphery extending circumferentially, said parts being so shaped, arranged and proportioned that when the tilting frame is in one position of its movement, said ribs will enter the grooves of one of the power transmitting members and the other will be out of contact with the wheel and when the tilting frame is shifted to the other limit of its movement, the opposite power transmitting member will have the ribs of the driven wheel enter and maintain driving contact with the grooves of the last named driving member, for the purposes stated.

Des Moines, Iowa, June 5, 1923.

CHARLES PHELPS.